US005562119A

United States Patent [19]

Will

[11] Patent Number: 5,562,119

[45] Date of Patent: Oct. 8, 1996

[54] MOUNTING ARRANGEMENT FOR CONTROL LEVER ON AN INDUSTRIAL TRUCK

[75] Inventor: Harald Will, Aschaffenburg, Germany

[73] Assignee: Linde Aktiengesellschaft, Germany

[21] Appl. No.: 248,308

[22] Filed: May 24, 1994

[51] Int. Cl.$^{6}$ .............................. F16K 31/44; G05G 9/04

[52] U.S. Cl. ................ 137/315; 74/471 XY; 137/636.2; 180/333

[58] Field of Search .......................... 74/471 XY, 473 R, 74/473 P; 137/315, 636, 636.2, 636.3; 180/89.11, 89.14, 89.15, 89.17, 89.18, 326, 328, 333, 323

[56] References Cited

U.S. PATENT DOCUMENTS

| | | | |
|---|---|---|---|
| 2,854,088 | 9/1958 | Dence | 180/328 |
| 3,329,229 | 7/1967 | Mukho | 180/328 |
| 4,076,302 | 2/1978 | Sable | 180/89.14 |
| 4,140,200 | 2/1979 | Tucek | 180/333 |
| 4,187,737 | 2/1980 | Mori et al. | 137/636.2 |
| 4,238,008 | 12/1980 | Higgins et al. | 180/326 |
| 4,262,958 | 4/1981 | Houseman et al. | 180/89.14 |
| 4,276,953 | 7/1981 | Penzotti et al. | 180/89.14 |
| 4,318,571 | 3/1982 | Vize | 303/71 |
| 4,478,308 | 10/1984 | Klaassen | 180/333 |
| 4,646,869 | 3/1987 | Kerner, Jr. | 180/334 |
| 4,821,837 | 4/1989 | Fifer | 180/334 |
| 5,360,312 | 11/1994 | Mozingo | 137/636.2 |

FOREIGN PATENT DOCUMENTS

| | | | |
|---|---|---|---|
| 8000679 | 4/1980 | European Pat. Off. . | |
| 0560219 | 9/1993 | European Pat. Off. | B66F 9/20 |
| 2046676 | 11/1980 | United Kingdom . | |

OTHER PUBLICATIONS

French Search Report, Apr. 3, 1995, 2 pages.
Examiner's Report to the Comptroller under Section 17 (The Search Report) Jul. 11, 1994, p. 1 of 1.

*Primary Examiner*—George L. Walton
*Attorney, Agent, or Firm*—Webb Ziesenheim Bruening Logsdon Orkin & Hanson, P.C.

[57] ABSTRACT

The improvement in an industrial truck having a container, an operator station and an adjustable control valve fixed on the truck adjacent to the container comprising a control lever for the control valve mounted on a panel member pivotally mounted on the container. A rocking lever is operatively connected to the control lever and is pivotally connected to the control valve. The rocking lever is pivotally mounted on the panel member. The pivotal axis of the panel member and the pivotal axis of the rocking lever are the same so that the panel and the rocking lever can be pivoted out of an operating position wherein the control lever is within easy reach of the operator station into a service position providing access to the interior of the container on the truck.

21 Claims, 2 Drawing Sheets

MOUNTING ARRANGEMENT FOR CONTROL LEVER ON AN INDUSTRIAL TRUCK

BACKGROUND OF THE INVENTION

1. Field of the Invention

The invention relates generally to a mounting arrangement for an articulated control lever on an industrial truck. The control lever is operatively connected to spools of control valves which are fixed on the truck and the control lever can be pivoted out of the operating position. The control lever on an industrial truck will often be located above a container within easy reach of the truck operator and can be pivoted from the operating position into a service position in order to provide unhindered access to the interior of the container.

2. Description of Related Prior Art

United Kingdom Patent No. 2,046,676, entitled "Battery-Powered Lift Trucks", discloses a battery-powered forklift truck with a battery container and a cowl, wherein the operator's seat is located beside the cowl and the control levers for the control valves for the operation of the lifting mast are located next to the operator's seat for easy access by the operator. The control valves and control levers therefore are pivotally mounted to allow unhindered access to the interior of the battery container for removal of the battery for servicing. The disadvantage of the arrangement disclosed in this patent is that flexible or elastic hoses are required between the control valves and the control fluid reservoir to permit the control valves to pivot relative to the container. Flexible hoses are undesirable because they must have freedom to move during pivoting movement of the control valves, but they cannot be laid in tight curves. Elastic hoses flex during the pivoting movement of the valves, and this flexing eventually results in leaks or failure of the hoses caused by fatigue. Additionally, a considerable amount of force is required to pivot the control valves from the operating position into the service position because the hoses have to be bent out of the way.

SUMMARY OF THE INVENTION

The underlying object of the invention is to provide a mounting arrangement of the kind described above which has improved reliability. According to the invention, this object is achieved by attaching the control valves to the container in a fixed or permanent position and pivoting the control lever relative to the spools of the control valves by means of rocking levers mounted on a shaft. The control lever and the mounting shaft for the rocking levers are attached to the upper surface of a swivel plate which is pivoted about the axis of articulation of the rocking levers on the control valve spools.

Thus, in an electric counterweighted forklift truck, the control lever can be located in the correct ergonomic position next to the operator's seat above the battery box while permitting operation of the control lever while the control valves remain in a fixed position on the truck. The control valves are fixed on the front wall of the battery container when the forklift truck is viewed in the direction of travel. This arrangement makes it possible to dispense with flexible and/or elastic hoses for the hydraulic fluid. Furthermore, the hydraulic fluid hoses need not be laid in large-radius curves and are not subjected to bending stresses. The horizontal distance between the control lever and the control valves is bridged by pivotally mounted rocking levers. The pivot axis of the swivel plate which carries the rocking levers and the control lever is aligned with the axis of articulation between the spools of the control valves and one end of the rocking levers so that unintentional actuation of the spools of the control valves cannot occur when the swivel plate is pivoted into the service position.

The spool of each control valve moves in a straight line, and the rocking lever connected to the control valve spool follows a circular path when the control valve is operated. Therefore, in a further development of the invention, the spool of each control valve is connected to the end of a rocking lever by a ball joint. The ball of the ball joint is secured to a clamp at the side which grasps the end of the spool which is extending vertically upward out of the control valve. Thus, when the rocking lever is pivoted, the spool of the control valve moves up and down in a straight line and at the same time is pivoted about its axis to compensate for the different movements of the control lever and the rocking lever arm which results in unstressed and substantially play-free actuation.

As a rule, the lifting mast of a counterweighted forklift truck can be tilted, making it necessary to provide an operating arrangement for the tilting hydraulics in addition to an operating arrangement for the lifting carriage which moves up and down along the lifting mast. Therefore, it is expedient to provide two control valves for individual or simultaneous operation by a common control lever. The spool of each control valve is moved by a rocking lever and the rocking levers are mounted on a common shaft. The ends of the rocking levers remote from the control valves are in operative connection with the control lever so that only one control valve is operated when the control lever is moved in a first plane; only the other control valve is operated when the control lever is moved in a second plane perpendicular to the first plane, and both control valves are operated when the control lever is moved in a direction between the two planes.

The common control lever is advantageously connected to the two rocking levers by a coupling element which has a first ball joint for connection with the first rocking lever and a second ball joint for connection with an intermediate element and which, in relation to a system of coordinates in which the rocking levers are disposed in the X direction and swivelled in the Z direction, is spaced from the first ball joint in the X direction and the center point of which lies on the axis which connects the center point of the first ball joint with the center point of the ball joint between the first rocking lever and the spool of the first control valve. A third ball joint is located from the second ball joint in the Y direction and is connected with a second rocking lever. The intermediate element is mounted on a swivel plate by a fourth ball joint which is spaced from the second ball joint in the Z direction.

Thus, when the control lever is moved in the X direction, only the first rocking lever and, hence, the spool of the first control valve is operated. The movement of the end of the rocking lever arm remote from the control valve follows a circle and the movement of the control lever follows a circle lying opposite the circle of the end of the rocking lever arm and the movements are equalized by the floating mounting of the coupling element by the intermediate element on the swivel plate.

When the control lever is moved in the Y direction, only the second rocking lever, and hence, the spool of the second control valve, is operated. Here again, the circular movements of the end of the second rocking lever remote from the control valve and the control lever are equalized by the intermediate element.

When the control lever is moved into a position between the X direction and the Y direction, both rocking levers and the spools of both control valves are operated. In every case, the intermediate element permits a deflecting movement of the third ball joint which results in freedom from stress.

A complete understanding of the invention will be obtained from the following description when taken in connection with the accompanying drawing figures wherein like reference characters identify like parts throughout.

DETAILED DESCRIPTION OF THE PREFERRED EMBODIMENT

Figure 1:
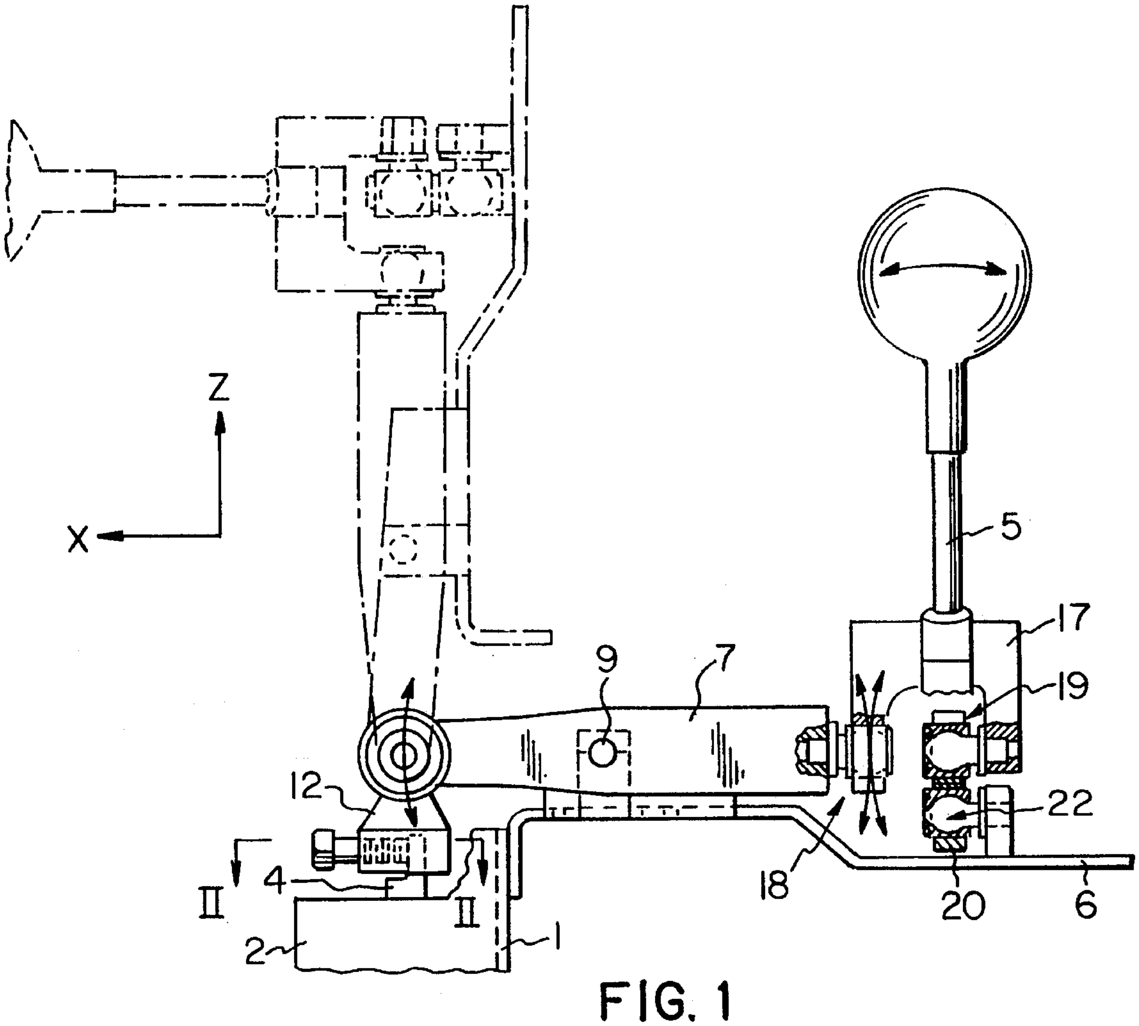
FIG. 1 is a section on line I—I of FIG. 3 with parts shown in phantom.

With reference to the drawing figures, control valves 2 and 3 for controlling the flow of hydraulic fluid to and from the lifting and tilting cylinders of a lifting mast are attached to the front wall 1 of a container, such as a battery box on a battery-powered counterweighted forklift truck. Each control valve 2 and 3 has a substantially vertical adjustable control valve spool 4. A common control lever 5 for control valve spools 4 of control valves 2 and 3 is positioned on the truck so as to be within ergonomically favorable reach of the operator. The movement of control lever 5 is shown by the solid arrow curved lines in FIG. 1 of the drawings.

Figure 2:
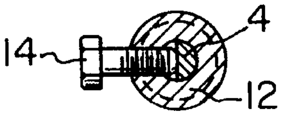
FIG. 2 is a section on line II—II of FIG. 1.

Control lever 5 is mounted on a cover member, swivel plate or panel member 6 in a manner to be described hereinafter. It will be understood that swivel plate 6 may be a body panel of the truck which is pivotably mounted to afford access to the interior of the container for servicing. Spools 4 of the control valves are connected with control lever 5 so as to be free of play, by first and second rocking levers 7 and 8 which are pivotally mounted on a common shaft 9 which is mounted on swivel plate 6. A ball joint 10 connects an end of first rocking lever 7 with spool 4 of first control valve 2, and a ball joint 11 connects an end of second rocking lever 8 with spool 4 of second control valve 3. Ball joint 10 includes a ball which is connected to a cup-shaped clamp 12 at the side and ball joint 11 includes a ball which is connected to a cup-shaped clamp 13 at the side. Each clamp 12 and 13 grasps the end of a spool 4 which projects upwardly from a control valve 2 or 3. Clamps 12 and 13 are clamped in place by a screw 14 or 15, respectively, which engages the diametral flat face of the semi-cylindrical end of a spool 4 as shown in FIG. 2 of the drawings.

The center point of the ball in ball joints 10 and 11 lies on a common axis in the initial position when rocking levers 7 and 8 are stationary. This axis is the pivot axis about which swivel plate 6 is pivoted. Swivel plate 6 has an extension **6*a* which is pivotally mounted on a pin 16 which is carried on an extension 1*a* of front wall 1 of the container. The axis of pin 16 coincides with the axis of the balls in ball joints 10 and 11 and, thus, is a part of the pivot axis about which swivel plate 6 is pivoted upwardly into the service position shown by the dash-dotted lines in FIG. 1 of the drawings without affecting the positions of spools 4 of the control valves, because rocking levers 7 and 8 are not moved when swivel plate 6** is pivoted upwardly to access the inside of the container.

Figure 3:
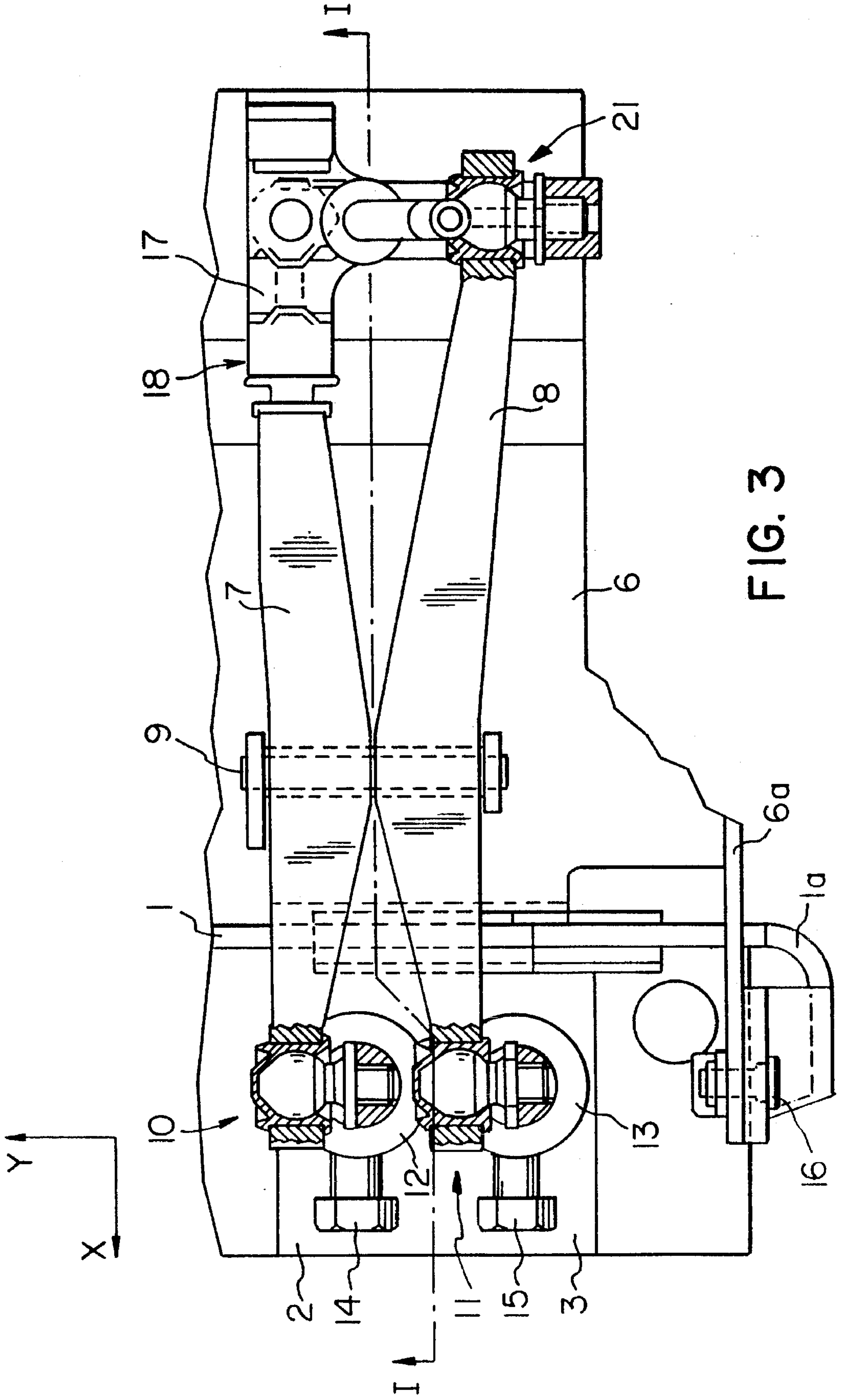
FIG. 3 is a plan view of the arrangement according to the invention.

The ends of rocking levers 7 and 8 remote from the control valves are connected with control lever 5 by a coupling element 17. Reference is made to a system of coordinates X-Y-Z shown on FIGS. 1 and 3 of the drawings for a detailed explanation of the manner of operation of coupling element 17. The X axis extends in the longitudinal direction of rocking levers 7 and 8 (i.e., in the horizontal direction as seen in FIG. 1 of the drawings), and the Z axis extends in the vertical direction as seen in FIG. 1 of the drawings.

Coupling element 17 is connected by a first ball joint 18 with an end of first rocking lever 7. A second ball joint 19 is spaced from first ball joint 18 in the X direction and its center point lies on the axis which connects the center point of first ball joint 18 with the center point of ball joint 10 between first rocking lever 7 and spool 4 of first control valve 2. This second ball joint 19 connects coupling element 17 with an intermediate element 20. A third ball joint 21, which is spaced from second ball joint 19 in the Y direction, connects coupling element 17 with second rocking lever 8. The intermediate element 20 is mounted on swivel plate 6 by a fourth ball joint 22 which is spaced from second ball joint 19 in the Z direction.

When control lever 5 is moved in the X direction, only first rocking lever 7 moves, so that only the first control valve 2 is operated. The pivoting axis of coupling element 17 runs through second ball joint 19 and third ball joint 21 in the Y direction. Therefore, second rocking lever 8 does not move. Intermediate element 20 equalizes the difference in movement between the movement of the rocking lever arm of first rocking lever 7 remote from the control valve which follows a circle, and the movement of coupling element 17 which follows a circle lying opposite the circle of the rocking lever arm, in that it allows a deflecting movement of coupling element 17 in the X direction.

When control lever 5 is moved in the Y direction, only second rocking lever 8 moves, and hence, only second control valve 3 is operated. The pivot axis of coupling element 17 runs through first ball joint 18 and second ball joint 19 in the X direction. Here again, intermediate element 20 equalizes the circular movement of the rocking lever arm of second rocking lever 8 remote from the control valve and the circular movement of control lever 5 or coupling element 17 at right angles to it.

When control lever 5 is moved to a position between the X and Y directions, both rocking levers 7 and 8 are moved, and hence, both control valves 2 and 3 are operated. In every case, intermediate element 20 allows a deflecting movement of second ball joint 19, resulting in freedom from stress.

The operating arrangement according to the invention makes it possible to locate control lever 5 in an ergonomically favorable position in relation to the operator with the control valve or valves being fixed to the truck so that they do not move when control lever 5 is pivoted out of the way to provide access to the container. Because the ball of each ball joint is located in a slotted plastic housing, the operating arrangement is substantially free of play. When control lever 5 is operated, the arrangement of the ball joint equalizes the offset in the X direction. The accommodation between the arcuate movements of control lever 5 and the ends of rocking levers 7 and 8 remote from the control valves is achieved through the floating mounting of coupling element 17 on swivel plate 6 by intermediate element 20. The movement of the ends of rocking levers 7 and 8 adjacent control valves 2 and 3 in the X direction, relative to spools 4 of the control valves, is accommodated by automatic rotation of spools 4 of the control valve about their axes, since ball joints 10 and 11 are offset in the Y direction from the spool axes, which extend in the Z direction. The clamped connections between the spools of the control valves and rocking levers 7 and 8 prevent play at this point. The consistently small amount of play within the operating arrangement of the invention minimizes noise (rattling of the lever) and wear.

In addition, the adjustment of the connection between each control valve spool and its rocking lever is not required because the use of a clamp provides substantially automatic equalization of tolerances in the X direction by rotation of the spool about its axis; in the Y direction by displacement of the rocking lever about shaft 9; and in the Z direction by the overlapping of the clamp connection, i.e., by the amount of extension of spool 4 into clamp 12 or 13.

Assembly of the arrangement is very simple by positioning clamp 12 loosely over a spool 4 of a control valve and clamping it onto spool 4 by tightening screw 14, thereby automatically equalizing the tolerances. The clamped connection with spool 4 can also take the form of a slip coupling to avoid damage to control valves 2 and 3 or to rocking levers 7 and 8 in the event of overloading which could occur if the control lever is used by the operator as an aid to climbing onto the truck.

It will be understood that swivel plate or panel member 6 can also be used as a mounting member for additional controls, such as a handbrake lever, rocker switches, etc. in an ergonomically advantageous arrangement.

While an embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

I claim:

1. In an industrial truck having a body, a container having a wall, an operator station, at least one control valve fixed on said truck adjacent said container and an adjustable spool in said at least one control valve, the improvement comprising a panel member supporting a control lever for said control valve, means for pivotally mounting said panel member on said container, means for supporting said control lever on said panel member for articulation, connecting means pivotally connected to said adjustable spool of said at least one control valve for operatively connecting said control lever with said adjustable spool of said at least one control valve, said means for pivotally mounting said panel member on said container located on the same pivot axis as said connecting means pivotally connected to said adjustable spool of said at least one control valve, and a pivot means for pivotally mounting said connecting means on said panel member, whereby said panel member and said lever can be pivoted out of an operating position wherein said control lever is within reach of said operator station into a service position wherein said panel member and said control lever are located to provide access to the interior of said container.

2. The invention according to claim 1, wherein said connecting means is a rocking lever having a first end adjacent said adjustable spool of said at least one control valve, a ball joint for pivotal connection of said first end of said rocking lever to said adjustable spool of said at least one control valve, said ball joint including a ball having a center laterally offset relative to the axis of said adjustable spool of said at least one control valve, and clamp means pivotally securing said ball of said ball joint to said adjustable spool of said at least one control valve.

3. The invention according to claim 1, wherein two control valves are fixed on said truck adjacent to said container for operation by said control lever and wherein said connecting means for said adjustable spool of each control valve is a rocking lever, said adjustable spool of each of said control valves being adapted to move in a substantially straight line, pivotal connecting means for operatively connecting each of said adjustable spools to its respective rocking lever coaxial with said means for pivotally mounting said panel member on said container for moving said adjustable spool, said rocking levers being pivotally mounted on a common shaft mounted on said panel member and means operatively connecting the ends of said rocking levers remote from said pivotal connecting means to said control lever, whereby movement of said control lever in a first plane operates only one of said control valves, movement of said control lever in a second plane perpendicular to said first plane operates only the other of said control valves, and movement of said control lever in a direction between the first and second planes operates both of said control valves.

4. The invention according to claim 2, wherein two control valves are mounted on said truck adjacent to said container for operation by said control lever and said connecting means for said adjustable spool of each control valve is a rocking lever, said adjustable spool of each of said control valves being adapted to move in a substantially straight line, pivotal connecting means for operatively connecting each said adjustable spool to its respective rocking lever coaxial with said means for pivotally mounting said panel member on said container for moving said adjustable spool, said rocking levers being pivotally mounted on a common shaft mounted on said panel member and means operatively connecting the ends of said rocking levers remote from said pivotal connecting means to said control lever, whereby movement of said control lever in a first plane operates only one of said control valves, movement of said control lever in a second plane perpendicular to said first plane operates only the other of said control valves, and movement of said control lever in a direction between the first and second planes operates both of said control valves.

5. The invention according to claim 2, including a coupling element secured to said control lever, a first ball joint connecting said coupling element to said first end of said first rocking lever pivoting about an axis extending generally in an X direction, and a second ball joint connecting said coupling element to an intermediate element pivoting about an axis extending in a Y direction so that the end of said rocking lever moves in a Z direction, said second ball joint being spaced from said first ball joint in the X direction and its center located on a line connecting the center of said first ball joint with the center of said ball joint connecting said first end of said first rocking lever and said spool of said first control valve, said coupling element further including a third ball joint spaced from said second ball joint in the Y direction and connecting said coupling element to a first end of a second rocking lever, said intermediate element being mounted on said panel member by a fourth ball joint spaced from said second ball joint in the Z direction.

6. In an industrial truck according to claim 4, including a coupling element secured to said control lever, a first ball joint connecting said coupling element to said first end of said first rocking lever pivoting about an axis extending generally in an X direction, and a second ball joint connecting said coupling element to an intermediate element pivoting about an axis extending in a Y direction so that the end of said rocking lever moves in a Z direction, said second ball joint being spaced from said first ball joint in the X direction and its center located on a line connecting the center of said first ball joint with the center of said ball joint connecting said first end of said first rocking lever and said spool of said first control valve, said coupling element further including a third ball joint spaced from said second ball joint in the Y direction and connecting said coupling element to a first end of a second rocking lever, said intermediate element being mounted on said panel member by a fourth ball joint spaced from said second ball joint in the Z direction.

7. In an industrial truck having a body, a container having an interior and a wall, an operator station and at least one control valve with an elongated adjustable spool mounted on said container wall and a control lever for said at least one control valve, the improvement comprising a panel member supporting said control lever for said at least one control valve adjacent said operator station, pivot means for pivotally mounting said panel member on said container wall, means for supporting said control lever on said panel member for articulated movement, connecting means for operatively connecting said control lever to said adjustable spool of said at least one control valve, a pivot means for pivotally mounting said connecting means on said panel member, said connecting means having a first end adjacent said adjustable spool of said at least one control valve and a second end opposite said first end, a ball joint pivotally connecting said first end of said connecting means to said adjustable spool of said at least one control valve, said ball joint including a ball having a pivot axis coaxial with said pivot means for pivotally mounting said panel member on said container wall and a center laterally offset relative to said adjustable spool of said at least one control valve, and clamp means for securing said ball of said ball joint to said adjustable spool of said at least one control valve, whereby said panel member and said connecting means can be pivoted about the same pivot axis out of an operating position wherein said control lever is adjacent said operator station into a service position to provide access to the interior of said container.

8. The invention set forth in claim 7 including a second control valve with an elongated adjustable spool mounted on said container wall for operation of said elongated adjustable spool of said at least one control valve by said control lever, a second connecting means for operatively connecting said control lever to said adjustable spool of said second control valve, a pivot means for pivotally mounting said second connecting means on said panel member, said second connecting means having a first end adjacent said adjustable spool of said second control valve and a second end opposite said first end, a ball joint pivotally connecting said first end of said second connecting means to said adjustable spool of said second control valve, said ball joint including a ball having a pivot axis coaxial with said pivot means for pivotally mounting said panel member on said container wall and a center laterally offset relative to said adjustable spool of said second control valve, and clamp means for securing said ball of said ball joint to said adjustable spool of said second control valve, whereby movement of said control lever in a first plane operates only said at least one control valve, movement of said control lever in a second plane perpendicular to said first plane operates only said second control valve, and movement of said control lever in a direction between the first and second planes operates both said at least one control valve and said second control valve.

9. The invention set forth in claim 8 wherein said connecting means for said adjustable spool of each of said at least one control valve and said second control valve is a rocking lever and said adjustable spools being adapted to move in a substantially straight line, said rocking levers being pivotally mounted on a common shaft mounted on said panel member for moving said adjustable spools in a straight line.

10. The invention as set forth in claim 8 including a coupling element secured to said control lever, a first ball joint connecting said coupling element to said second end of said connecting means and pivoting about an axis extending generally in an X direction, and a second ball joint connecting said coupling element to an intermediate element pivoting about an axis extending in a Y direction so that said second end of said connecting means moves in a Z direction, said second ball joint being spaced from said first ball joint in the X direction and its center located on a line connecting the center of said first ball joint with the center of said ball joint connecting said first end of said connecting means and said adjustable spool of said at least one control valve, said coupling element further including a third ball joint spaced from said second ball joint in the Y direction and connecting said coupling element to said second end of said second connecting means, said intermediate element being mounted on said panel member by a fourth ball joint spaced from said second ball joint in the Z direction.

11. The invention as set forth in claim 9 including a coupling element secured to said control lever, a first ball joint connecting said coupling element to said second end of said first connecting means pivoting about an axis extending generally in an X direction, and a second ball joint connecting said coupling element to an intermediate element pivoting about an axis extending in a Y direction so that said second end of said connecting means moves in a Z direction, said second ball joint being spaced from said first ball joint in the X direction and having its center located on a line connecting the center of said first ball joint with the center of said ball joint connecting said second end of said connecting means and said adjustable spool of said at least one control valve, said coupling element further including a third ball joint spaced from said second ball joint in the Y direction and connecting said coupling element to said second end of said second connecting means, said intermediate element being mounted on said panel member by a fourth ball joint spaced from said second ball joint in the Z direction.

12. In an industrial truck having a body, a container having an interior and a wall, an operator station and a first control valve with an elongated adjustable spool mounted on said container wall and a control lever for adjusting said adjustable spool of said first control valve, the improvement comprising a container cover supporting a control lever for said adjustable spool of said first control valve located adjacent to said operator station, pivot means for pivotally mounting said container cover on said container wall, articulation means for mounting said control lever on said container cover, connecting means for operatively connecting said control lever to said adjustable spool of said first control valve, a pivot means for pivotally mounting said connecting means on said container cover, said connecting means having a first end adjacent said adjustable spool of said first control valve and a second end opposite said first end, a ball joint pivotally connecting said first end of said connecting means to said adjustable spool of said first control valve, said ball joint including a ball having a pivot axis coaxial with said pivot means for pivotally mounting said container cover on said container wall and a center laterally offset relative to said adjustable spool of said first control valve, and clamp means for securing said ball of said ball joint to said adjustable spool of said first control valve, whereby said container cover and said connecting means can be pivoted about the same pivot axis from an operating position wherein said control lever is adjacent to said operator station into a service position to provide access to said interior of said container.

13. The invention set forth in claim 12 including a second control valve with an elongated adjustable spool mounted on said container wall for operation of said elongated adjustable spool of said second control valve by said control lever, a second connecting means for operatively connecting said control lever to said adjustable spool of said second control valve, a pivot means for pivotally mounting said second connecting means on said container cover, said second connecting means having a first end adjacent said adjustable spool of said second control valve and a second end opposite said first end, a ball joint pivotally connecting said first end of said second connecting means to said adjustable spool of said second control valve, said ball joint including a ball having a pivot axis coaxial with said pivot means for pivotally mounting said container cover on said container wall and a center laterally offset relative to said adjustable spool of said second control valve, and clamp means for securing said ball of said ball joint to said adjustable spool of said second control valve, whereby movement of said control lever in first plane operates only said first control valve, movement of said control lever in a second plane perpendicular to said first plane operates only said second control valve, and movement of said control lever in a direction between the first and second planes operates both said first control valve and said second control valve.

14. The invention set forth in claim 13 wherein said connecting means for said adjusting spool of each of said control valves is a rocking lever and said adjusting spools move in a substantially straight line, said rocking levers being pivotally mounted on a common shaft mounted on said container cover for moving said adjustable spools in a straight line.

15. The invention as set forth in claim 13 including a coupling element secured to said control lever, a first ball joint connecting said coupling element to said second end of said connecting means for said first control valve and pivoting about an axis extending generally in an X direction, and a second ball joint connecting said coupling element to an intermediate element pivoting about an axis extending in a Y direction so that said second end of said connecting means moves in a Z direction, said second ball joint being spaced from said first ball joint in the X direction and its center located on a line connecting the center of said first ball joint with the center of said ball joint connecting said first end of said connecting means and said adjustable spool of said first control valve, said coupling element further including a third ball joint spaced from said second ball joint in the Y direction and connecting said coupling element to said second end of said second connecting means, said intermediate element being mounted on said panel member by a fourth ball joint spaced from said second ball joint in the Z direction.

16. The invention as set forth in claim 14 including a coupling element secured to said control lever, a first ball joint connecting said coupling element to said second end of said first connecting means pivoting about an axis extending generally in an X direction, and a second ball joint connecting said coupling element to an intermediate element pivoting about an axis extending in a Y direction so that said second end of said connecting means moves in a Z direction, said second ball joint being spaced from said first ball joint in the X direction and having its center located on a line connecting the center of said first ball joint with the center of said ball joint connecting said second end of said connecting means and said spool of said first control valve, said coupling element further including a third ball joint spaced from said second ball joint in the Y direction and connecting said coupling element to said second end of said second connecting means, said intermediate element being mounted on said panel member by a fourth ball joint spaced from said second ball joint in the Z direction.

17. An industrial truck having a body, a container having an interior and a wall mounted on said body, an operator station, a first control valve with an adjustable spool mounted on said container wall, a control lever for said first control valve, a cover member for said container, pivot means for pivotally mounting said cover member on said container wall, means for supporting said control lever on said cover member adjacent to said operator station for articulated movement, connecting means for operatively connecting said control lever to said adjustable spool of said first control valve pivotally mounted on said cover member, said connecting means having a first end adjacent to said adjustable spool of said first control valve and a second end adjacent to said control lever, a ball joint pivotally connecting said first end of said connecting means to said adjustable spool of said first control valve, said ball joint including a ball having a pivot axis coaxial with said pivot means for mounting said cover member on said container wall and a center laterally offset from said adjustable spool of said first control valve, and clamp means for securing said ball of said ball joint to said adjustable spool of said first control valve, whereby said cover member, said connecting means and said control lever can be pivoted about a single pivot axis out of an operating position wherein said cover member closes the interior of said container into a service position to provide access to the interior of said container.

18. An industrial truck as set forth in claim 17 including a second control valve mounted on said container wall, said second control valve having an adjustable spool for one of individual and simultaneous operation with said adjustable spool of said first control valve by said control lever, a second connecting means for operatively connecting said control lever to said adjustable spool of said second control valve pivotally mounted on said cover member, said second connecting means having a first end adjacent to said adjustable spool of said second control valve and a second end adjacent to said control lever, a ball joint for pivotally connecting said first end of said second connecting means to said adjustable spool of said second control valve, said ball joint including a ball having a pivot axis coaxial with said pivot means for mounting said cover member on said container wall and a center laterally offset from said adjustable spool of said second control valve, and clamp means for securing said ball of said ball joint to said adjustable spool of said second control valve, whereby movement of said control lever in a first plane operates only said first control valve, movement of said control lever in a second plane perpendicular to said first plane operates only said second control valve, and movement of said control lever in a direction between the first and second planes operates both said first control valve and said second control valve.

19. An industrial truck as set forth in claim 18 wherein said connecting means for said adjustable spool of each of said first control valve and said second control valve is a rocking lever and said adjustable spools being adapted to move in a substantially straight line, said rocking levers being pivotally mounted on a common shaft mounted on said cover member for moving said adjustable spools in a straight line.

20. An industrial truck as set forth in claim 18 including a coupling element secured to said control lever, a first ball joint connecting said coupling element to said second end of said connecting means and pivoting about an axis extending generally in an X direction, and a second ball joint connecting said coupling element to an intermediate element pivoting about an axis extending in a Y direction so that said second end of said connecting means moves in a Z direction, said second ball joint being spaced from said first ball joint in the X direction and its center located on a line connecting the center of said first ball joint with the center of said ball joint connecting said first end of said connecting means and said adjustable spool of said first control valve, said coupling element further including a third ball joint spaced from said second ball joint in the Y direction and connecting said coupling element to said second end of said second connecting means, said intermediate element being mounted on said cover member by a fourth ball joint spaced from said second ball joint in the Z direction.

21. An industrial truck as set forth in claim 19 including a coupling element secured to said control lever, a first ball joint connecting said coupling element to said second end of said first connecting means pivoting about an axis extending generally in an X direction, and a second ball joint connecting said coupling element to an intermediate element pivoting about an axis extending in a Y direction so that said second end of said connecting means moves in a Z direction, said second ball joint being spaced from said first ball joint in the X direction and having its center located on a line connecting the center of said first ball joint with the center of said ball joint connecting said second end of said connecting means and said adjustable spool of said first control valve, said coupling element further including a third ball joint spaced from said second ball joint in the Y direction and connecting said coupling element to said second end of said second connecting means, said intermediate element being mounted on said cover member by a fourth ball joint spaced from said second ball joint in the Z direction.

* * * * *

UNITED STATES PATENT AND TRADEMARK OFFICE

CERTIFICATE OF CORRECTION

PATENT NO. : 5,562,119

DATED : October 8, 1996

INVENTOR(S) : Harald Will

It is certified that error appears in the above-indentified patent and that said Letters Patent is hereby corrected as shown below:

Title page, after '[22]' filing information, insert
--[30] Foreign Application Priority Data
May 28, 1993 [DE] Germany ... P 43 17 915.0--.

Claim 13 Line 29 Column 9 "in first" should read --in a first--.

Claim 14 Line 36 Column 9 "adjusting" should read --adjustable--.

Claim 14 Line 37 Column 9 "adjusting" should read --adjustable--.

Signed and Sealed this

Seventeenth Day of December, 1996

Attest:

Bruce Lehman

BRUCE LEHMAN

*Attesting Officer* *Commissioner of Patents and Trademarks*